(12) United States Patent
Mehring et al.

(10) Patent No.: US 9,098,786 B2
(45) Date of Patent: Aug. 4, 2015

(54) RFID TAG WITH REMOTE SENSORS AND/OR REMOVABLE BATTERIES

(75) Inventors: Peter Arnold Mehring, Los Altos, CA (US); Edmond Sardariani, San Jose, CA (US)

(73) Assignee: Intelleflex Corporation, San Jose, CA (US)

( * ) Notice: Subject to any disclaimer, the term of this patent is extended or adjusted under 35 U.S.C. 154(b) by 312 days.

(21) Appl. No.: 13/607,544

(22) Filed: Sep. 7, 2012

(65) Prior Publication Data
US 2014/0061315 A1    Mar. 6, 2014

Related U.S. Application Data

(60) Provisional application No. 61/695,263, filed on Aug. 30, 2012.

(51) Int. Cl.
G06F 17/00 (2006.01)
G06K 19/06 (2006.01)
H04Q 5/22 (2006.01)
G06K 19/07 (2006.01)

(52) U.S. Cl.
CPC ....... *G06K 19/0717* (2013.01); *Y10T 29/49817* (2015.01); *Y10T 29/49826* (2015.01)

(58) Field of Classification Search
CPC . G06K 19/0716; G06K 19/0717; G06K 7/00; H04Q 2209/47; A61B 5/00
USPC ........... 235/375, 492; 340/10.5, 12.51, 13.26, 340/10.1
See application file for complete search history.

(56) References Cited

U.S. PATENT DOCUMENTS

| | | | |
|---|---|---|---|
| 2009/0012375 A1* | 1/2009 | Pitsillides | 600/302 |
| 2009/0171163 A1* | 7/2009 | Mates et al. | 600/300 |
| 2009/0303001 A1* | 12/2009 | Brumer et al. | 340/10.1 |
| 2010/0245057 A1* | 9/2010 | Chamarti et al. | 340/10.42 |
| 2011/0248834 A1* | 10/2011 | Warner et al. | 340/10.34 |
| 2012/0302168 A1* | 11/2012 | Asikainen | 455/41.2 |

* cited by examiner

*Primary Examiner* — Michael G Lee
*Assistant Examiner* — Laura Gudorf
(74) *Attorney, Agent, or Firm* — Zilka-Kotab, PC

(57) ABSTRACT

A system according to one embodiment includes a Radio Frequency Identification (RFID) tag, the RFID tag having a housing; an interface configured for detachable coupling to a connector that is coupleable or coupled to an external module having at least one of a battery and a remote sensor; a controller for processing data derived from an output of the remote sensor; a memory for storing the data derived from an output of the remote sensor and/or the processed data; and an antenna coupled to the controller for enabling backscatter communication.

12 Claims, 8 Drawing Sheets

RFID TAG WITH REMOTE SENSORS AND/OR REMOVABLE BATTERIES

RELATED APPLICATIONS

This application claims priority to provisional U.S. Patent Appl. No. 61/695,263 filed Aug. 30, 2012, and which is herein incorporated by reference.

FIELD OF THE INVENTION

The present invention relates to Radio Frequency (RF) systems, and more particularly, this invention relates to Radio Frequency Identification (RFID) tags with remote and/or removable sensors and/or batteries.

BACKGROUND

RFID tags are used to collect, store and transmit a wide range of important data, in a wide range of system settings and environmental conditions. However, RFID tags operate using RF signals, and so are generally constrained by their environments, particularly where the environment may include RF shielding material. Accordingly, RFID tags typically must be placed on an exterior of any container or item exhibiting RF shielding properties. This constraint limits the utility of RFID tags.

BRIEF SUMMARY

A system according to one embodiment includes a Radio Frequency Identification (RFID) tag, the RFID tag having a housing; an interface configured for detachable coupling to a connector that is coupleable or coupled to an external module having at least one of a battery and a remote sensor; a controller for processing data derived from an output of the remote sensor; a memory for storing the data derived from an output of the remote sensor and/or the processed data; and an antenna coupled to the controller for enabling backscatter communication.

An external module according to another embodiment includes an enclosure; a sensor coupled to the enclosure; and a connector having a jack that is detachably coupleable to a Radio Frequency Identification (RFID) tag.

A method according to yet another embodiment includes mounting an Radio Frequency Identification (RFID) tag on a barrier; and positioning an external module that is coupled to the RFID tag on another side of the barrier.

A method according to another embodiment includes detaching a first external module from physical communication with a Radio Frequency Identification (RFID) tag; and attaching a second external module to the RFID tag.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of RFID-based systems and/or related systems and methods, as well as operation and/or component parts thereof.

In one general embodiment, a system includes a Radio Frequency Identification (RFID) tag, the RFID tag including a housing; an interface configured for detachable coupling to a connector that is coupleable or coupled to an external module having at least one of a battery and a remote sensor; a controller for processing data derived from an output of the remote sensor; a memory for storing the data derived from an output of the remote sensor and/or the processed data; and an antenna coupled to the controller for enabling backscatter communication.

In another general embodiment, an external module includes an enclosure; a sensor coupled to the enclosure; and a connector having a jack that is detachably coupleable to a Radio Frequency Identification (RFID) tag.

In yet another general embodiment, a method includes mounting an Radio Frequency Identification (RFID) tag on a barrier, and positioning an external module that is coupled to the RFID tag on another side of the barrier.

In another general embodiment, a method includes detaching a first external module from physical communication with a Radio Frequency Identification (RFID) tag; and attaching a second external module to the RFID tag.

Figure 1:
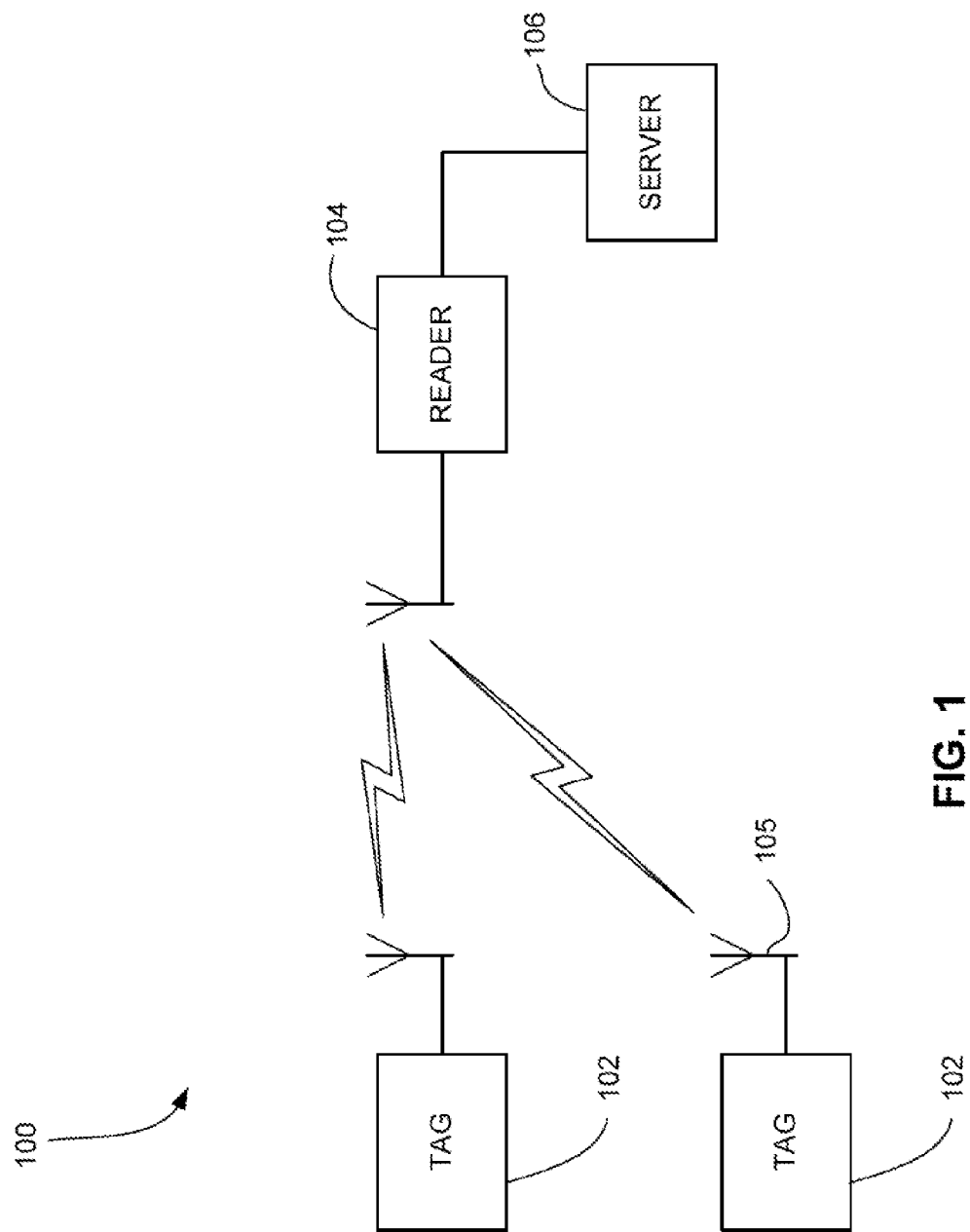
FIG. 1 is a system diagram of an RFID system according to one embodiment.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader, anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:
1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:
Class-1
  Identity tags (RF user programmable, range ~3 m)
  Lowest cost
Class-2
  Memory tags (20 bit address space programmable at ~3 m range)
  Security & privacy protection
  Low cost
Class-3
  Semi-passive tags (also called semi-active tags and battery assisted passive (BAP) tags)
  Battery tags (256 bits to 2M words)
  Self-Powered Backscatter (internal clock, sensor interface support)
  ~100 meter range
  Moderate cost
Class-4
  Active tags
  Active transmission (permits tag-speaks-first operating modes)
  ~300 to ~1,000 meter range
  Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
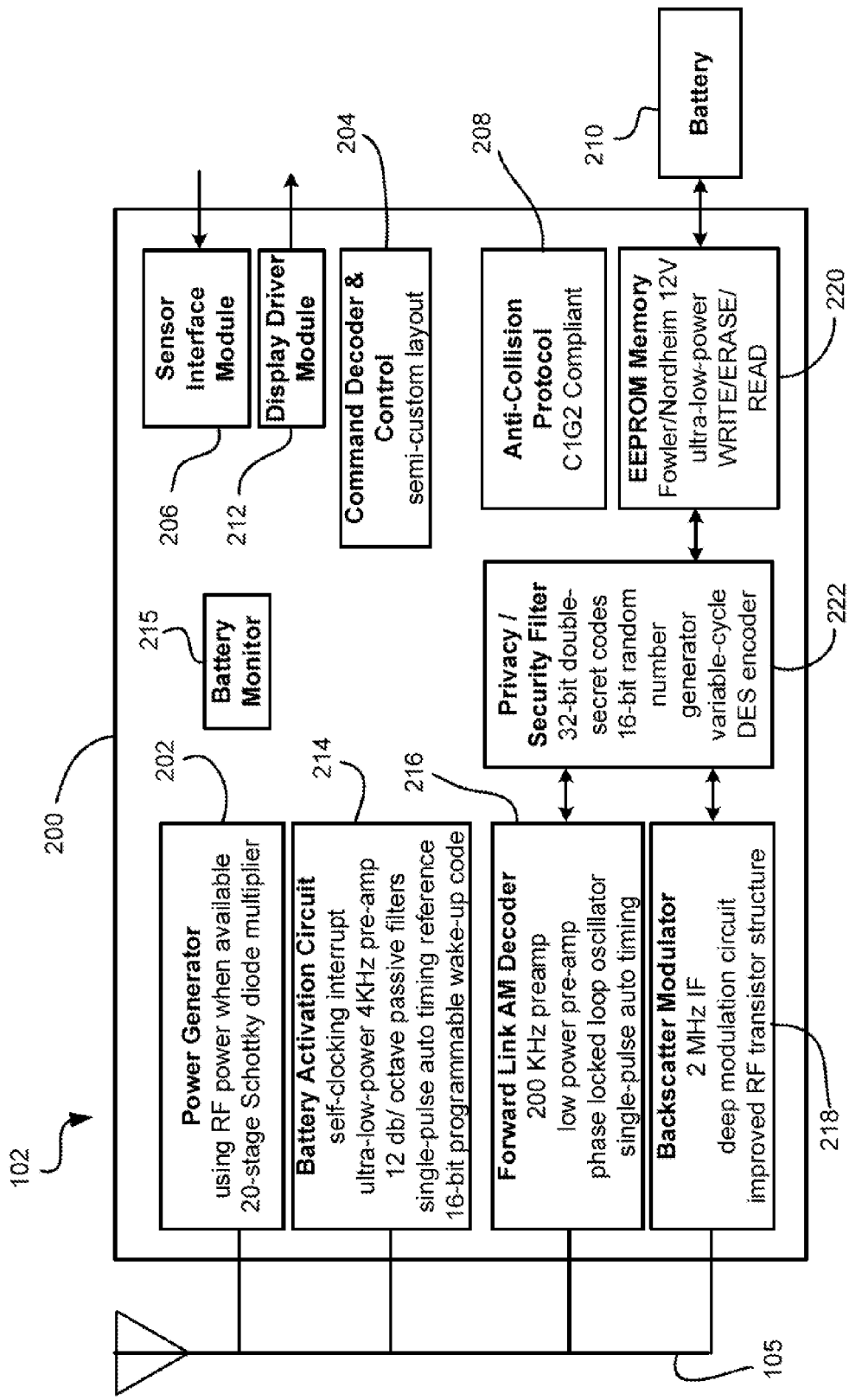
FIG. 2 is a system diagram for an integrated circuit (IC) chip for implementation in an RFID device according to one embodiment.

Embodiments of the RFID device are preferably implemented in conjunction with a Class-3 or higher Class IC chip, which typically contains the processing and control circuitry for most if not all tag operations. FIG. 2 depicts a conceptual circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the circuit 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

The RFID device may have a dedicated power supply, e.g. battery: may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy. A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 μA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

The circuit 200 may also incorporate a security encryption circuit 222 for operating under one or more security schemes, secret handshakes with readers, etc.

According to various exemplary embodiments, RFID tags may not function properly and/or efficiently in certain conditions and/or locations. In one example, which is in no way intended to limit the invention, an RFID tag may be intended to monitor one or more conditions such as temperature within a metal shipping container. However, the shipping container's metal structure may inhibit the RFID tag from communicating, e.g., receiving instructions, transmitting data, relaying an error, etc., with an RFID tag reader. Placing the RFID tag on the exterior of the container may remedy the communication problems, but then the RFID tag has no access to the conditions in the interior of the container.

To remedy the foregoing, an RFID tag may have an interface adapted to communicate with a sensor which is external and/or coupleable to the RFID tag, thereby allowing an RFID tag to maintain communication with an RFID tag reader wile gathering readings in conditions and/or locations that otherwise could be problematic for RF communications.

Figure 3:
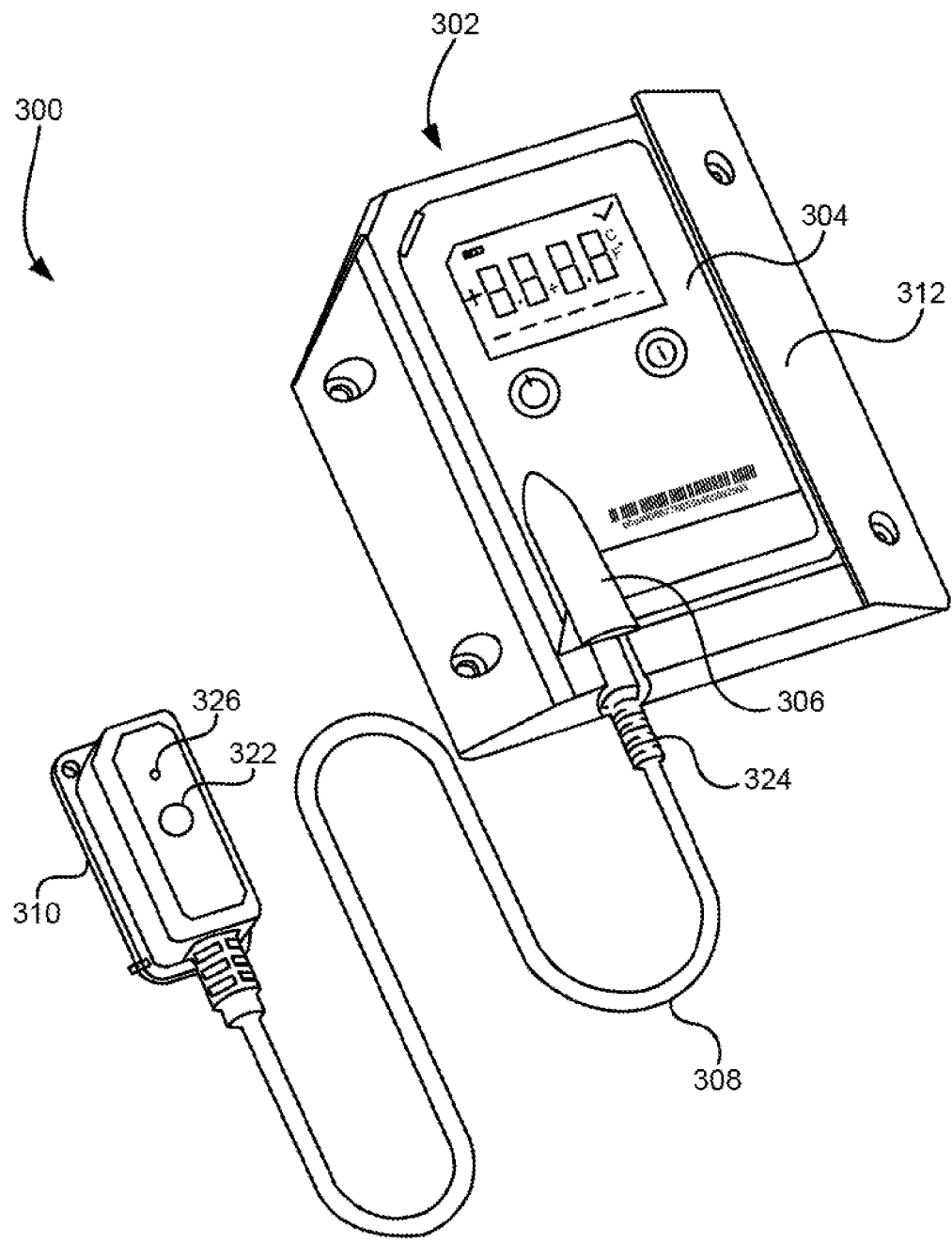
FIG. 3 is a system diagram of one embodiment.

FIG. 3 depicts a system 300 in accordance with one embodiment. As an option, the present system 300 may be implemented in conjunction with features from any other embodiment listed herein, such as those described with reference to the other FIGS. Of course, however, such system 300 and others presented herein may be used in various applications and/or in permutations which may or may not be specifically described in the illustrative embodiments listed herein. Further, the system 300 presented herein may be used in any desired environment.

According to the embodiment illustrated in FIG. 3, the system 300 may include an RFID tag 302 having a housing 304. As depicted, the RFID tag 302 may also include an interface 306 configured for detachable coupling to a connector 308 that is coupleable or coupled to an external module 310 having at least one of a battery and a remote sensor.

Figure 4:
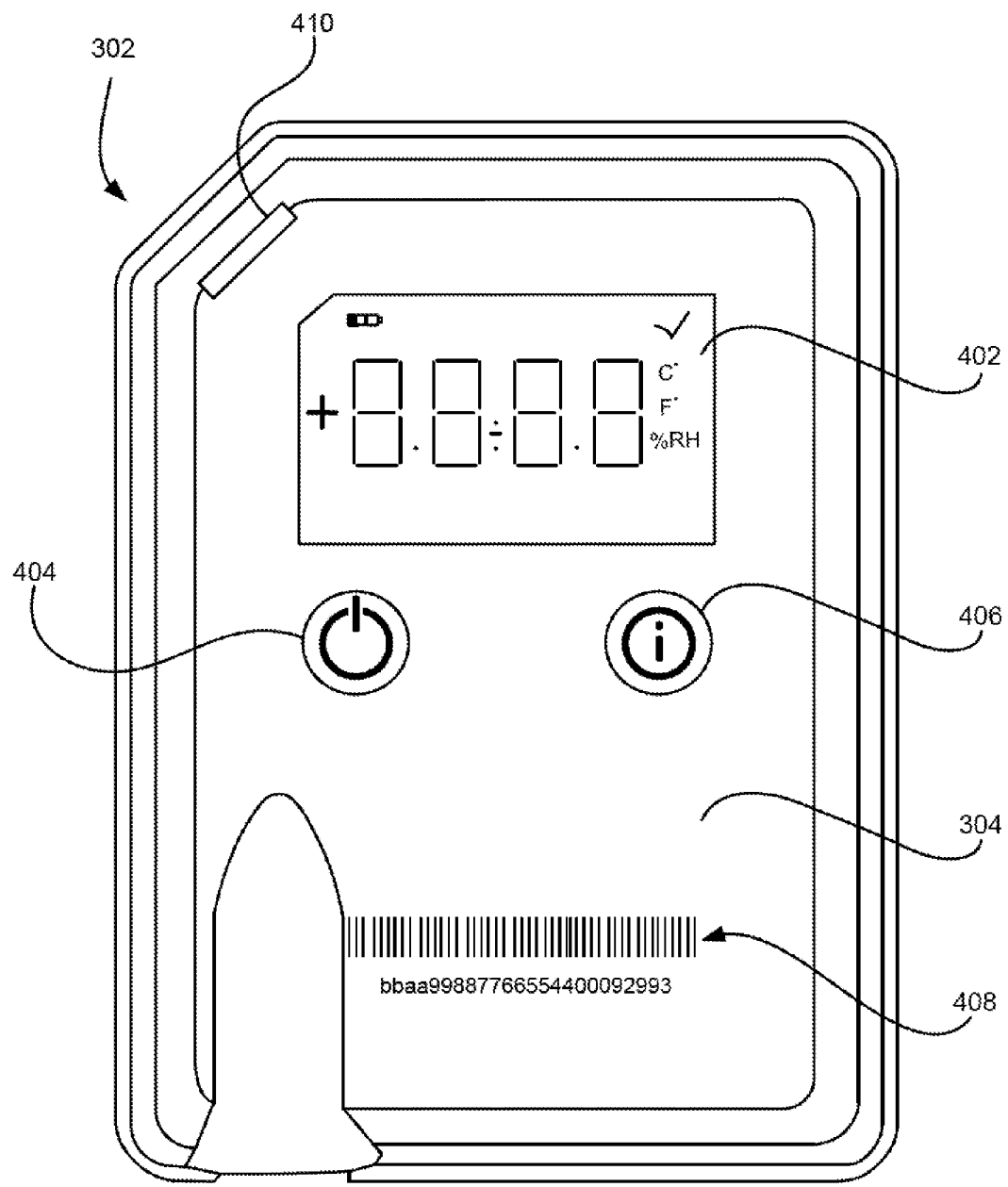
FIG. 4 is a side view of the RFID tag shown in FIG. 3.

Referring now to FIG. 4, the RFID tag 302 is depicted according to a preferred embodiment, which is in no way intended to limit the invention. As shown, the RFID tag 302 preferably incorporates a display screen 402. According to various approaches, the display screen may incorporate an LCD screen, a touchscreen, a backlit screen, etc. or any other type of screen known in the art. The display screen may preferably display settings of the RFID tag 302, data being collected, battery life, connection status with a RFID tag reader, power state, programming options, etc.

Additionally, as illustrated, the RFID tag 302 may also include interactive buttons, which may include, but are not limited to a power button 404 and a toggle button 406. According to various approaches, additional and/or other known types of user interface elements may be present, such as a switch, touchpad, button, etc. or any combination of elements. In a preferred approach, the power button 404 may preferably turn the RFID tag 302 on and off, but may also activate a sleep mode, power save mode, display screen power only, etc. or any other setting which would be apparent to one skilled in the art upon reading the present description. Moreover, the toggle button 406 may preferably switch display and/or tag settings, scroll through display outputs, cycle between tabs, etc. An indicator 410 such as an LED light may also be present, e.g. to support programming functions, denote occurrence of an event, etc.

With continued reference to FIG. 3, the RFID tag 302 includes a controller (not shown) which may preferably process data derived from an output of a remote sensor in the remote module 310. The data derived from the output of the remote sensor may include the raw sensor data; a digital derivation thereof; a preprocessed version of the sensor output, e.g., by a processor in the remote module; etc. According to various approaches, such processing may include simply storing the data to memory, converting or calibrating data derived from the output of the remote sensor, adding a timestamp and/or other information to the data, preparing the data for transmission to an RFID reader, etc. Moreover, in light of the present description, a controller may incorporate any controller described herein, including parts and/or the circuit 200 of FIG. 2.

The RFID tag further includes a memory of any known type for storing the data derived from an output of the remote sensor and/or the processed data. According to various approaches, a memory may incorporate any memory explained and/or suggested herein. In one approach, the data collected by an RFID tag may be stored in a memory, which may include, but is not limited to Electrically Erasable Programmable Read-Only Memory (EEPROM) (e.g., 220 of FIG. 2). Static Random-Access Memory (SRAM), Ferroelectric Random-Access Memory (FRAM), etc.

According to various other approaches, the memory may be located in the RFID tag, electrically coupled to the RFID tag, in an RFID tag reader, electrically coupled to an RFID tag reader, in a cloud data management system, etc. It should be noted that in light of the present description, "electrically coupled" preferably includes an electrical connection via a wire, a cable, wirelessly, etc.

The RFID tag also includes an antenna of any known type coupled to the controller for enabling backscatter communication e.g., with an RFID tag reader. According to various approaches, an antenna may incorporate any antenna explained and/or suggested herein (e.g., antenna 105 of FIG. 1).

According to other approaches, a battery according to any of the examples described herein, may provide power to the controller, processor, a real time clock, etc. In one approach, the battery may be housed in the housing 302 of FIG. 3. In another approach, the battery may be located in the external module 310. For example, the external module 310 may preferably be configured to provide battery power to the controller, processor, a real time clock. etc. via the connector. Moreover, such battery in an external module may power operational functions of an RFID tag, e.g., data collection, a real time clock, processing, display screen, communication with an RFID tag reader, transmission of data from the RFID tag to the RFID tag reader, etc. In addition, or alternatively, the battery in the external module 310 may only provide power to a device in the external module, such as a sensor, visual or audible indicator, etc. In a further example, a battery (e.g., 210 of FIG. 2) may be present in the housing 302, e.g., for providing power to a real time clock. In such approach, the real time clock may be used to provide timestamp information to sensor readings received from a remote sensor, timestamp log entries, etc. In yet another example, batteries may be present in both the housing and the external module.

As shown in FIG. 4, the RFID tag housing 304 may additionally include an identification code 408. According to various approaches, the identification code 408 may be in the form of a barcode, a number, an identification of the RFID tag, etc. In one example, which is in no way intended to limit the invention, a barcode (identification code) may be scanned by an electronic device such as a bar code scanner, upon which the identity of the corresponding RFID tag is determined and may be associated into a group, uploaded to a system, used for communication with at least one RFID tag reader, etc.

Figure 5:
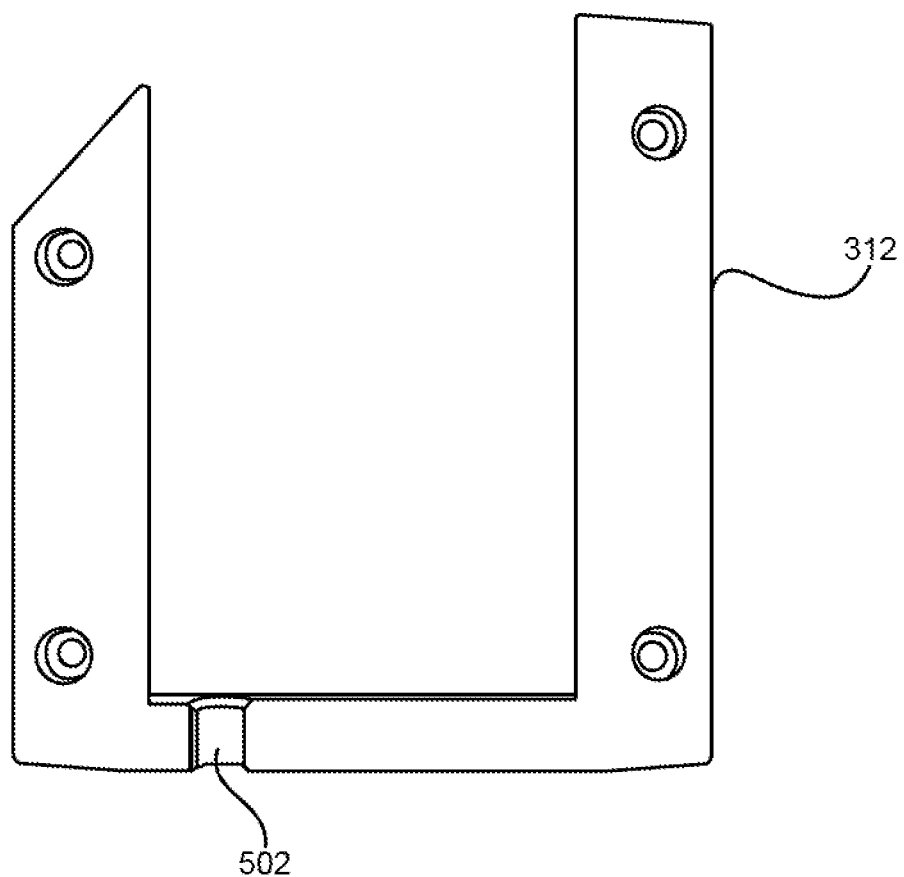
FIG. 5 is a side view of the bracket shown in FIG. 3.

With reference to FIGS. 3 and 5, a bracket 312 may be used to secure the housing 304 to a surface, object, container, the ground, etc. According to various approaches, the bracket 312 may incorporate apertures, clips, fasteners, hooks, adhesive, etc. to facilitate securement thereof to a surface. Moreover, the bracket 312 may preferably incorporate a feature 502 such as a void, recess, indent, etc. such that the connector 308 may be attached and/or detached to the interface, depending on the desired embodiment.

With continued reference to FIG. 3, the interface 306 may preferably be configured for detachable coupling to a connector 308. Moreover, the connector 308 of FIG. 3 may be coupleable or coupled to an external module 310. As illustrated, according to one approach, the interface 306 may include a receptacle which preferably facilitates the detachable coupling between the interface 306 and connector 308. According to various approaches, the receptacle may include a USB port, an AUX jack, a MicroUSB port, an HDMI port. etc. or any other type of receptacle which would be apparent to one skilled in the art upon reading the present description. In various approaches, the connector 308 may include a cable, a wire, etc. In some approaches, the connector may be long and flexible, e.g. a cable. In other approaches, the connector may be rigid. In further approaches, the connector may have or simply be two jacks in a male-male configuration, a male-female configuration, a female-female configuration, etc.

Moreover, the external module 310 of the system 300 may preferably include, but is not limited to, a battery and/or a remote sensor. According to various approaches, a battery and/or a remote sensor may incorporate a battery and/or sensor of any type known in the art. In one approach, a battery and a sensor may be housed within the same external module.

According to various other approaches, the battery and sensor may be housed in separate external modules. Thus, an external module having a battery and a second external module having a remote sensor may be attached to the RFID tag in series e.g. as depicted in FIG. 6, in parallel e.g. as depicted in FIG. 7, etc. depending on the desired embodiment.

Referring to FIG. 3, an external module 310 according to one embodiment includes an enclosure 320, and a sensor 322 coupled to the enclosure. The external module may include the connector 308. Thus, the connector may be integral (i.e. permanently fixed) with the external module, etc. In other approaches, the external module 310 is detachably coupleable to the connector 308. The connector 308 may have a jack 324 which can be any known type of electrical coupler (e.g., male or female) that is preferably detachably coupleable to an RFID tag 302. The external module 310 may also include a processor for processing signals from the sensor 322 and sending the processed signals to the RFID tag, e.g., to the controller thereof. Moreover, the external module 310 may also include a visual indicator 326 for indicating such things as active status of the external module or component thereof, battery state, a state of anything as determined by the RFID tag, etc.

Any external module described herein may be reusable and/or disposable.

Figure 6:
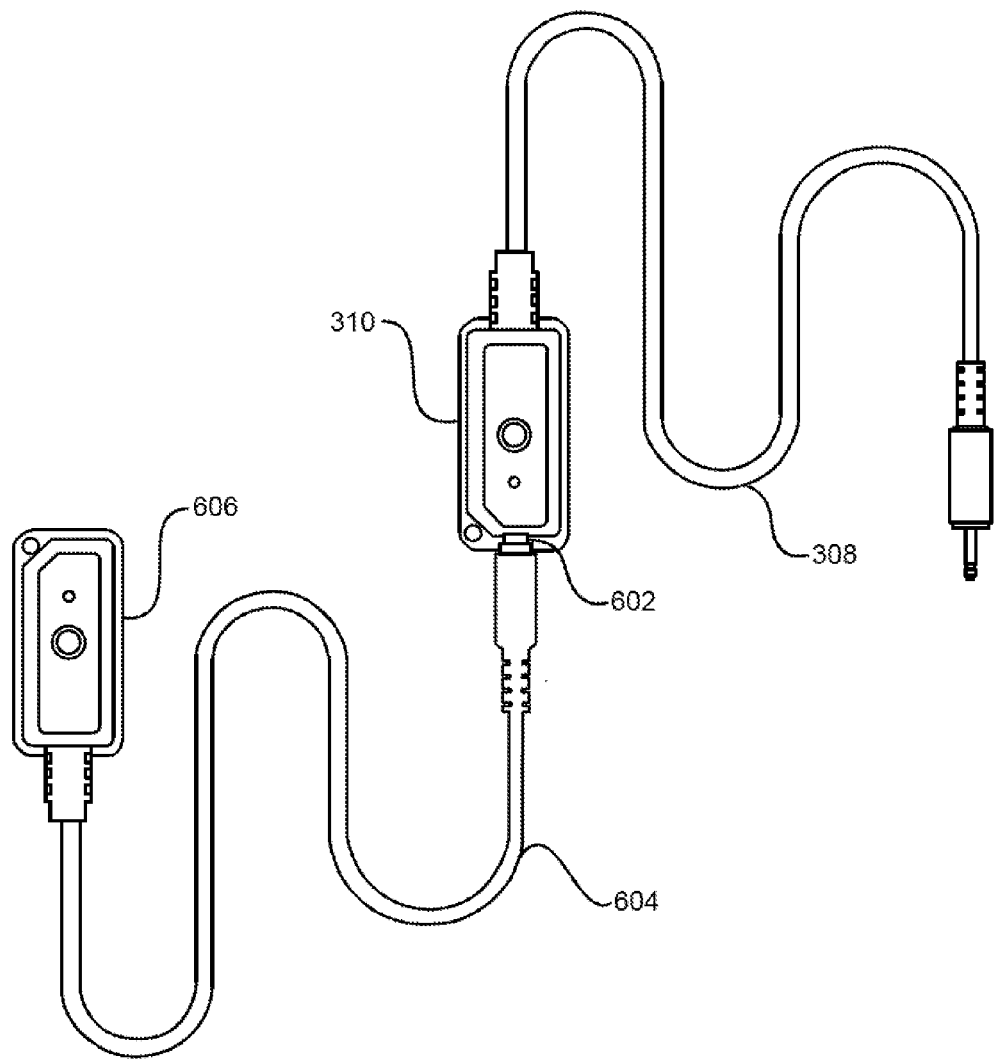
FIG. 6 is a side view of external modules coupled in series according to one embodiment.
Figure 7:
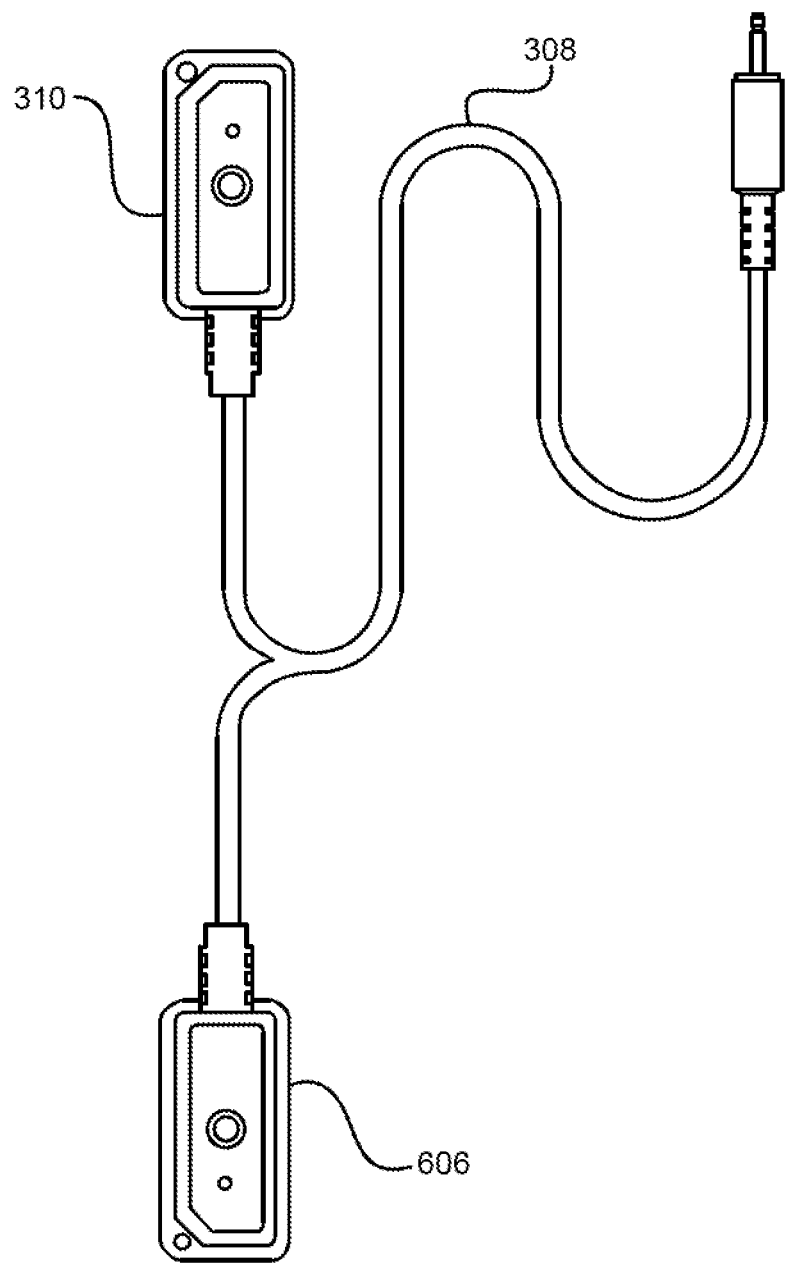
FIG. 7 is a side view of external modules coupled in parallel according to one embodiment.

As shown in FIG. 6, the external module 310 may include an interface 602 configured for detachable coupling to a second connector 604 that is coupleable or coupled to a second external module 606 having at least one of a battery and a sensor. According to various approaches, an embodiment may incorporate at least a second external module, at least a third external module, multiple external modules, etc. The second external module, third external module, etc. may incorporate at least one of a sensor and/or a battery.

Moreover, in another approach, the multiple external modules may form a network of sensors and/or batteries. Thus, according to one embodiment, a network may preferably be incorporated to provide multiple sensors to monitor data of an object and/or area to which the sensors are attached or proximate to (explained in further detail below). In one approach, a network may include sensors which may monitor data of an object and/or area more accurately than a single sensor and/or battery.

According to various approaches, external modules may be configured in a daisy chain configuration, star bus configuration, twisted pair, etc. or any other connecting configuration which would be apparent to one skilled in the art upon reading the present description.

In a preferred approach, the plurality of external modules and/or the network of external modules may connect to a single RFID tag. However, in other approaches, more than one RFID tag may be incorporated in the connected set or network of external modules, depending on the desired embodiment.

Referring to FIG. 3, the external module 310 may be detachably coupleable to the connector 308. Therefore, the external module 310 may be detached from the connector 308 without detaching the connector from the RFID tag 302. According to an example, if the battery needs to be replaced, the external module 310 having the battery may be detached from the connector 308 and replaced by a different external module. In an embodiment such as that shown in FIG. 6, where a battery is present in the second module 606, the second module may be replaced without disturbing a sensor in external module 310 and/or connector 308. In one example, if the battery is detached e.g., for replacement as explained above, a backup battery may supply power to the system for continued full or partial operation until a new battery is connected.

In another example, if the sensor needs to be removed for recalibration, replacement, etc., the external module housing it may be detached from the connector and/or the RFID tag. In yet another example, the battery and sensor are within the same external module.

Moreover, as explained above, the external module may be placed in harsh environments to gather data while the RFID tag itself is positioned in a safe and/or controlled environment. Therefore, the enclosure of the external module may preferably cover the sensor and/or battery, e.g., at least partially, completely, etc. as to protect them from various harsh environments. According to various embodiments, the external module may incorporate a housing which is one or more of waterproof, dustproof, freeze proof, resistant to high pressures, resistant to high temperatures, resistant to crushing, etc.

In another approach, the external module may be integral with a barrier, e.g., formed in the barrier, permanently coupled to the barrier, etc. An RFID tag can be connected to the external module using a connector.

Figure 8:
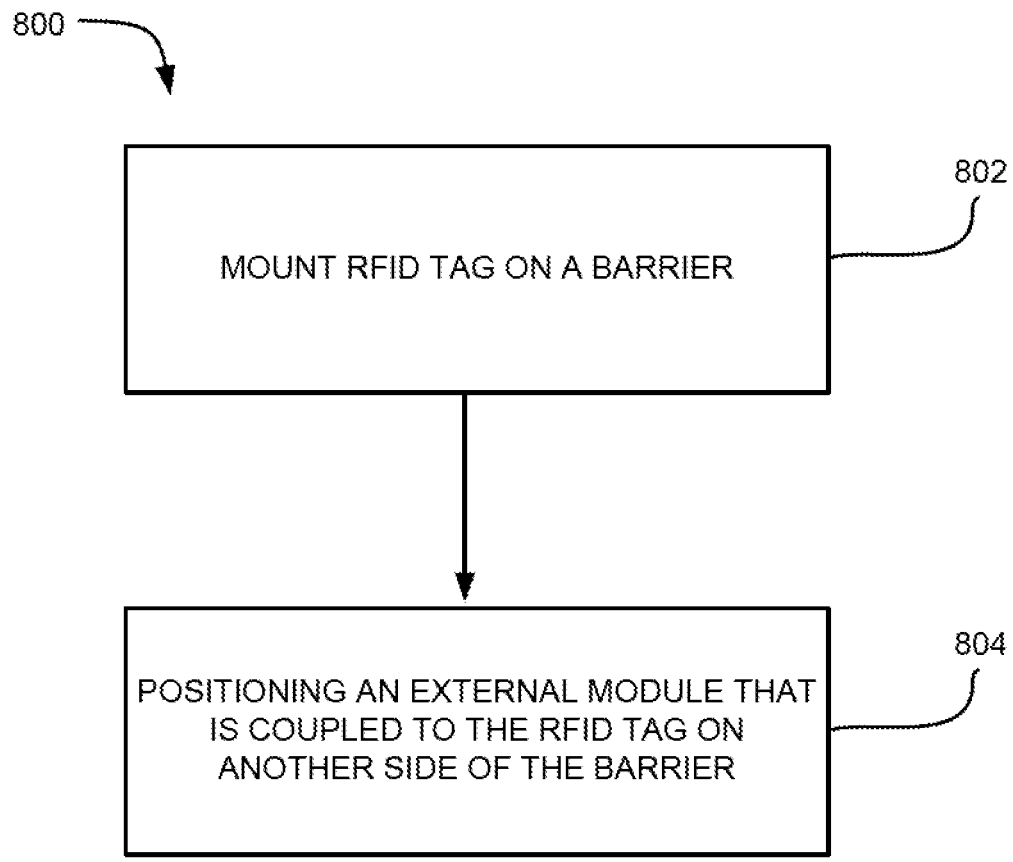
FIG. 8 is a flowchart showing the process steps of a method according to one embodiment.

FIG. 8 illustrates an exemplary method 800 of using various embodiments presented herein. As an option, the present method 800 may be implemented in conjunction with features from any other embodiment listed herein, such as those described with reference to the other FIGS. Of course, however, such method 800 and others presented herein may be used in various applications and/or in permutations which may or may not be specifically described in the illustrative embodiments listed herein. Further, the method 800 presented herein may be used in any desired environment.

In step 802, an RFID tag is mounted on a barrier e.g., of an RF shielding material, but could be of any type of material. Illustrative barriers include walls, cargo containers, pallets, products on a pallet, etc. A barrier of an RF shielding material may block at least 80% of RF energy from passing therethrough. Thus, if a barrier of an RF shielding material separates an RFID tag and an RFID tag reader, communication therebetween may be obstructed. Thus, in a preferred approach, an RFID tag may be positioned on an exterior of the aforementioned barrier, thereby preferably enabling communication.

In step 804, an external module that is coupled to the RFID tag may be positioned on another side of the aforementioned barrier, e.g., to gather data of interest there and provide that data to the RFID tag.

Any data gathered and/or stored by the RFID tag may be referred to as RFID tag data. Such data may be uploaded and stored on a cloud-based data management system.

According to a preferred approach, the "data" may include sensor data collected by the RFID tag. In a preferred approach, the RFID tag sensor may detect any number of environmental conditions and/or conditions of an object to which the sensor is attached or proximate to. According to various approaches, the sensor data may include, but is not limited to humidity, Ph, temperature, shock, vibration, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description.

According to an exemplary embodiment, the data may further include an association of the RFID tag and a product to which the RFID tag may be directly or indirectly coupled. Moreover, the data received from the RFID tag may include unique product information regarding the product that the RFID tag may be directly or indirectly coupled.

In one approach, an RFID tag reader may process some or all of the data collected by an RFID tag. According to various approaches, the RFID tag reader may order the RFID tag data to be delivered directly to a user e.g., via an entail, a printed list, etc.; uploaded to a cloud-based data management system accessible to an owner e.g., as a summary, the raw data, a representational graph, etc.; etc. Thus, in one particular approach, a summary of the information pertinent to a particular owner may be provided thereto by accessing the cloud-based data management system.

According to various approaches, a summary of RFID tag data may be compiled into a graph, a chart, a table, a list, etc. In one example, the summary of RFID tag data may incorporate a table which may include one, some, or all of an event time, the last temperature, the last temperature log time, number of extreme high alarms, the number of extreme low alarms, the number of high alarms, the number of low alarms, the number of temperature logs, the number of wave point logs, RSSI state, etc.

According to yet another approach, the RFID tag data may incorporate thresholds (e.g., high, low, specific values, etc.). In one approach, portions of the RFID tag data may be evaluated, thereby forming summaries e.g., quality factor, average, median, standard deviation, effective life of a product, etc. In varying approaches, RFID data summaries may be compared to the aforementioned thresholds, stored on the cloud-based data storage system, output to an approved owner, etc. In one example, once a produce shipment is delivered to a recipient, the data management system may compile the RFID tag data gathered during the delivery process, compare it to one or more threshold, and calculate an approximate shelf life of the produce. This approximated shelf life may be available to the recipient by any approach described and/or suggested herein, whereby the recipient may be able to accept or reject the delivery based on the approximated shelf life and/or other factors.

In any of the embodiments, techniques and/or hardware known in the art may be used to implement the various operations.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A system, comprising:
an external module having a sensor;
a Radio Frequency Identification (RFID) tag, the RFID tag comprising:
  a housing;
  an interface configured for detachable coupling to a connector that is coupleable or coupled to the external module;
  a controller for processing data derived from an output of the sensor of the external module;

a memory for storing the data derived from the output of the sensor and/or the processed data; and an antenna coupled to the controller for enabling backscatter communication; and a barrier of an RF shielding material, the RFID tag being positioned on one side of the barrier, the external module being positioned on another side of the barrier.

2. The system of claim 1, further comprising a battery in the housing, the battery being for providing power to a real time clock.

3. The system of claim 2, further comprising the external module having a battery, the external module being configured for providing battery power to the controller via the connector.

4. The system of claim 1, further comprising the external module having a battery, the external module being configured for providing battery power to the controller via the connector.

5. The system of claim 1, wherein the external module also includes a battery, the external module being configured for providing battery power to a processor via the connector.

6. The system of claim 1, wherein the external module includes a processor for processing signals from the sensor and sending the processed signals to the RFID tag.

7. The system of claim 1, wherein the external module includes an interface configured for detachable coupling to a second connector that is coupleable or coupled to a second external module having at least one of a battery and a sensor.

8. The system of claim 1, wherein the external module is disposable.

9. The system of claim 1, wherein the external module is detachably coupleable to the connector.

10. The system of claim 1, wherein the external module includes the connector.

11. The system of claim 1, further comprising at least three external modules in communication with the RFID tag, the external modules each having a sensor and/or battery.

12. The system of claim 1, further comprising at least three external modules in communication with the RFID tag, the external modules each having a sensor and optionally a battery.

* * * * *

UNITED STATES PATENT AND TRADEMARK OFFICE
CERTIFICATE OF CORRECTION

PATENT NO. : 9,098,786 B2  
APPLICATION NO. : 13/607544  
DATED : August 4, 2015  
INVENTOR(S) : Peter Arnold Mehring et al.

Page 1 of 1

It is certified that error appears in the above-identified patent and that said Letters Patent is hereby corrected as shown below:

In the specification:

col. 6, line 61 replace "FIG. 2). Static" with --FIG. 2), Static--;

col. 7, line 17 replace "time clock." with --time clock,--;

col. 9, line 65 replace "to humidity. Ph," with --to humidity, Ph,--;

col. 10, line 13 replace "via an entail," with --via an email,--.

Signed and Sealed this  
Twenty-second Day of March, 2016

Michelle K. Lee  
*Director of the United States Patent and Trademark Office*